United States Patent [19]

Asato

[11] 4,089,976

[45] May 16, 1978

[54] SYNTHESIS OF 1,2,3,4-TETRAHYDRO-4-OXO-[OR OXY-]-1-NAPHTHYLUREAS AS NOVEL GROWTH-PROMOTING COMPOUNDS FOR ANIMALS

[75] Inventor: Goro Asato, Titusville, N.J.

[73] Assignee: American Cyanamid Company, Stamford, Conn.

[21] Appl. No.: 713,939

[22] Filed: Aug. 12, 1976

Related U.S. Application Data

[63] Continuation-in-part of Ser. No. 670,330, Mar. 25, 1976, abandoned, which is a continuation-in-part of Ser. No. 582,559, May 30, 1975, abandoned.

[51] Int. Cl.² .................. A61K 31/17; C07C 127/19
[52] U.S. Cl. .............................. 424/322; 260/553 A
[58] Field of Search .................. 424/322; 260/553 A

[56] References Cited

U.S. PATENT DOCUMENTS 2,870,159   1/1959   Bloom .............................. 260/553 A

*Primary Examiner*—V. D. Turner
*Attorney, Agent, or Firm*—Edward A. Conroy, Jr.

[57] ABSTRACT

This invention relates to novel 1,2,3,4-tetrahydro-4-oxo-[-oxy-]-1-naphthylurea compounds and their derivatives. This invention also relates to method for the preparation of said compounds. This invention further relates to methods for the use of said tetrahydro-4-oxo-[oxy-]-1-naphthylurea compounds as animal growth regulators.

47 Claims, No Drawings

SYNTHESIS OF 1,2,3,4-TETRAHYDRO-4-OXO-[OR OXY-]-1-NAPHTHYLUREAS AS NOVEL GROWTH-PROMOTING COMPOUNDS FOR ANIMALS

CROSS REFERENCE TO RELATED APPLICATION

This application is a continuation-in-part of my co-pending application Ser. No. 670,330, filed Mar. 25, 1976, now abandoned which is in turn a continuation-in-part of application Ser. No. 582,559, filed May 30, 1975, now abandoned.

SUMMARY OF THE INVENTION

This invention relates to novel compounds of the structure:

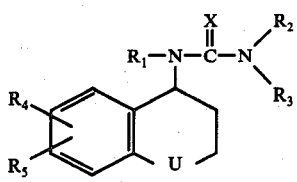

I wherein X is a member selected from the group consisting of oxygen and sulfur; U represents a divalent segment of the cyclohexane ring fused to the benzo ring and is selected from the group consisting of the moieties of the formulae: $>C=O$ and $>CHOR_6$; $R_1$ and $R_2$ are members independently selected from the group consisting of hydrogen and alkyl $C_1$-$C_4$; $R_3$ is a member selected from the group consisting of hydrogen, alkyl $C_1$-$C_4$, alkenyl $C_3$-$C_5$, alkynyl $C_3$-$C_5$, alkoxy $C_1$-$C_4$, benzyl and benzyloxy; $R_4$ is a member selected from the group consisting of hydrogen, alkyl $C_1$-$C_4$, alkoxy $C_1$-$C_4$; $R_5$ is a member selected from the group consisting of hydrogen and alkyl $C_1$-$C_4$; $R_6$ is a member selected from the group consisting of hydrogen, alkyl $C_1$-$C_4$, acyl $C_1$-$C_4$; with respect to the compounds of formula I when U is $>CHOR_6$, hereinafter the terms cis and trans refer to the configuration of the —$OR_6$ group with respect to the ureido group as defined hereinabove.

This invention also relates to the racemic mixtures and to the optically active forms of the compounds identified by formula I hereinabove. The optically active forms are designated as the (IR) and (IS) isomers, with the (IS) isomers generally being preferred since they appear to be biologically more active than the (IR) forms. The preferred (IS) isomers can be illustrated as follows:

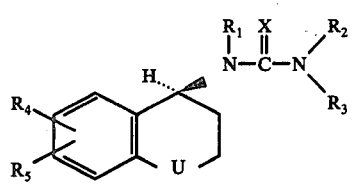

II wherein X, U and $R_1$ to $R_6$ are as hereinabove defined. The (R) isomers corresponding to the above (S) isomers can be illustrated as follows:

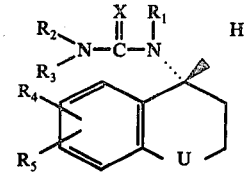

III wherein X, U and $R_1$ to $R_6$ are as defined for said formula II (S) isomer. Hereafter the terms (R) and (S) will refer to the absolute configuration at the 1-position.

The above-identified formulae II and III optically active urea compounds have the same absolute configuration at the 1- positions of the 1,2,3,4-tetrahydro-4-oxo-(-oxy-)-naphthylene as the 1,2,3,4-tetrahydro-1-naphthylamine used as starting material. In order to obtain the formula II (S) isomer or the formula III (R) isomer, it is necessary to start with the corresponding (S) or (R) isomer of 1,2,3,4-tetrahydro-1-naphthylamine or an appropriate derivative thereof.

The resolved 1,2,3,4-tetrahydro-1-naphthylamines have been reported in the literature R. Weidmann and J. P. Guette, *Comptes Rendus des Seances de l'Academie des Sciences* 268: 2225 (1969) as resulting from the Curtius reactions with the optically active 1,2,3,4-tetrahydronaphthalenecarboxylic acid azides. This work establishes the absolute configuration of the (R) and (S) isomers, but does not suggest the 4-substituted-1,2,3,4-tetrahydro-1-naphthylureas of the present invention, nor provides a practical preparative method for preparing the isomers in a high state of purity.

Among the hereinbefore identified and described formula I 1,2,3,4-tetrahydro-4-oxo-(-oxy-)-1-naphthylurea compounds the most preferred group is represented by structure Ia below:

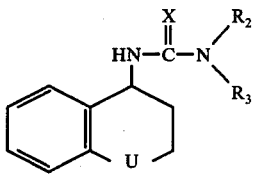

Ia wherein X is a member selected from the group consisting of oxygen and sulfur; U represents a divalent segment of the cyclohexane ring fused to the benzo ring and is selected from the group consisting of moieties of the formulae: $>C=O$ and $>CHOR_6$; $R_2$ is a member selected from the group consisting of hydrogen, alkyl $C_1$-$C_4$; $R_3$ is a member selected from the group consisting of hydrogen, allyl, 2-propynyl, alkoxy $C_1$-$C_4$, benzyl and benzyloxy; $R_6$ is a member selected from the group consisting of hydrogen, alkyl $C_1$-$C_4$ and acyl $C_1$-$C_4$; wherein said formula Ia compounds may be the racemic mixtures, the optical isomers [(S) and (R)] and when U is $>CHOR_6$ the cis and trans isomers thereof.

This invention also relates to methods for the preparation of the above-identified formula I tetrahydro-4-oxo-(-oxy-)-1-naphthylurea compounds.

In accordance with this invention, formula I tetrahydro-4-oxo-(-oxy-)-1-naphthylurea compounds, wherein X, U and $R_1$ to $R_6$ are as defined above, and wherein said compounds may be the racemic mixtures, the cis and trans isomers, or the optically active isomers thereof, can be conveniently prepared by several preferred routes. These preferred routes are hereinbelow described and illustrated in detail.

The precursor, formula V 1,2,3,4-tetrahydro-4-oxo-1-naphthylamine, common to a number of preferred routes leading to formula I compounds, can be conveniently prepared by the following route illustrated below:

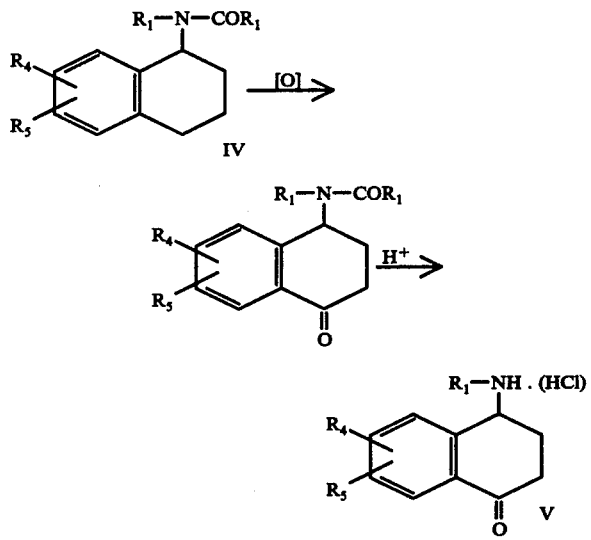

A formula IV compound, wherein $R_1$ is hydrogen or alkyl $C_1$-$C_4$; $R_4$ is hydrogen, alkyl $C_1$-$C_4$ or alkoxy $C_1$-$C_4$; $R_5$ is hydrogen or alkyl $C_1$-$C_4$; is reacted with a 2 to 8 mole equivalent of an oxidizing agent selected from the group consisting of ceric ammonium nitrate, ceric sulfate, chromic anhydride, sodium or potassium bichromate at a temperature between about 0° C and 100° C, and preferably 20° C to 60° C, in a solvent selected from the group consisting of aqueous solutions of acetic acid, acetonitrile, tetrahydrofuran, dioxane, dimethoxyethane, diethylene glycol dimethyl ether, which may contain nitric acid, phosphoric acid or perchloric acid or chromic anhydride-acetic anhydride followed by hydrolysis to yield the acid addition salt of formula V 1,2,3,4-tetrahydro-4-oxo-1-naphthylamine, wherein $R_1$, $R_4$ and $R_5$ are as defined above, and for illustrative purposes said amine acid salt is the hydrochloride.

1,2,3,4-Tetrahydro-4-oxo-1-naphthylurea compounds, represented by formula Ib below:

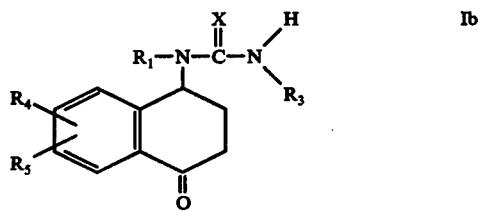

wherein $R_3$ is alkyl $C_1$-$C_4$, alkenyl $C_3$-$C_5$, alkynyl $C_3$-$C_5$, alkoxy $C_1$-$C_4$, benzyl or benzyloxy; X, $R_1$, $R_4$ and $R_5$ are as defined above, can be prepared by reacting the appropriately substituted formula V amine or an acid addition salt thereof with an appropriately substituted isocyanate or isothiocyanate of the formula: $R_3$—N=C=X, as illustrated below:

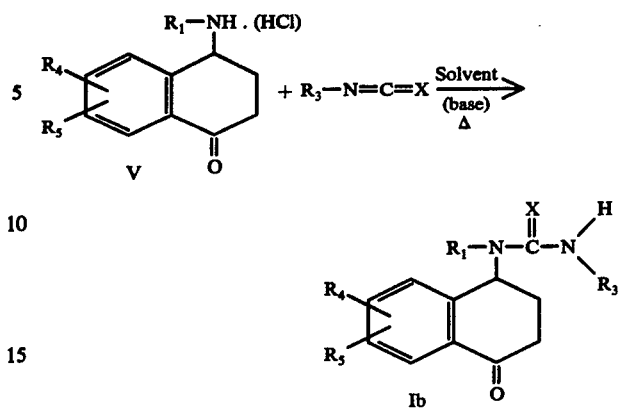

wherein X, $R_1$ and $R_3$ to $R_5$ are as defined above.

The reaction can be carried out using approximately equimolar amounts of the isocyanate or isothiocyanate and the amine or the acid addition salt thereof; however, it is generally preferable to employ 5% to 50% excess of the isocyanate or isothiocyanate. The reaction can be conducted at atmospheric or superatmospheric pressure at a temperature in the range of 0° C to 100° C, but is preferably conducted at atmospheric pressure at 0° C to 70° C, in the presence of an organic solvent.

Suitable organic solvents include aprotic aromatic solvents such as benzene, toluene and xylene; chlorinated hydrocarbon solvents such as methylene chloride, chloroform and dichloroethane; ethers such as tetrahydrofuran, diethyl ether, dimethoxyethane; lower alkyl $C_1$-$C_4$ ketones such as acetone, methyl ethyl ketone, methyl butyl ketone and methyl isobutyl ketone, or mixtures of said solvents.

When the above reaction is carried out using formula V amine acid addition salt, it is desirable to add an acid acceptor to the reaction mixture. Suitable acid acceptors include trialkylamines such as triethylamine, trimethylamine, pyridine or the like; alkali metal carbonates such as sodium or potassium carbonate; alkaline earth carbonates such as calcium carbonate, strong basic ion exchange resins, and aqueous alkali in a 2-phase system using an immiscible hydrocarbon solvent such as benzene, toluene, or a chlorinated hydrocarbon such as chloroform or dichloroethane. The hereinabove-described process is equally suitable to prepare formula Ib tetrahydro-4-oxo-1-naphthylurea compounds, wherein X is oxygen or sulfur, and $R_1$ is hydrogen or alkyl $C_1$-$C_4$.

1,2,3,4-Tetrahydro-4-oxo-1-naphthylurea compounds represented by formula Ic below:

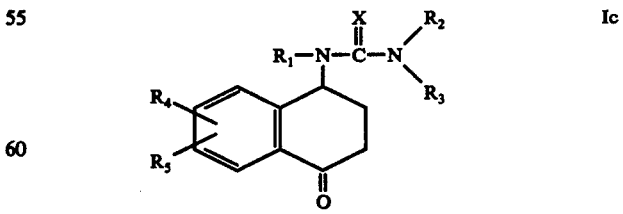

wherein X is oxygen or sulfur; $R_1$ is hydrogen or alkyl $C_1$-$C_4$; $R_2$ is alkyl $C_1$-$C_4$; $R_3$ is alkyl $C_1$-$C_4$, alkenyl $C_3$-$C_5$, alkynyl $C_3$-$C_5$, alkoxy $C_1$-$C_4$, benzyl or benzyloxy; $R_4$ is hydrogen, alkyl $C_1$-$C_4$ or alkoxy $C_1$-$C_4$; $R_5$ is hydrogen or alkyl $C_1$-$C_4$, can be conveniently prepared by the hereinabove-described process, by reacting the appropriately substituted formula V amine or its acid addition salt with an appropriately substituted carbamic or thiocarbamic acid chloride (bromide) of the formula:

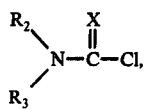

as illustrated below:

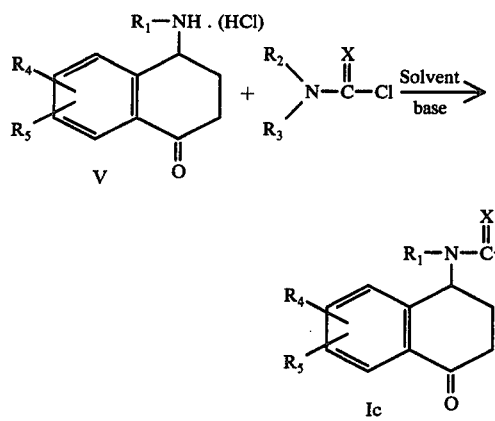

In the above reaction, it is desirable to add an acid acceptor to the reaction mixture. Suitable acid acceptors are selected from the group of acid acceptors listed above.

1,2,3,4-Tetrahydro-4-oxo-1-naphthylurea compounds of formula Id below:

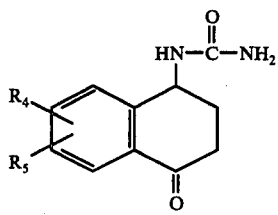

can be prepared by the following route:

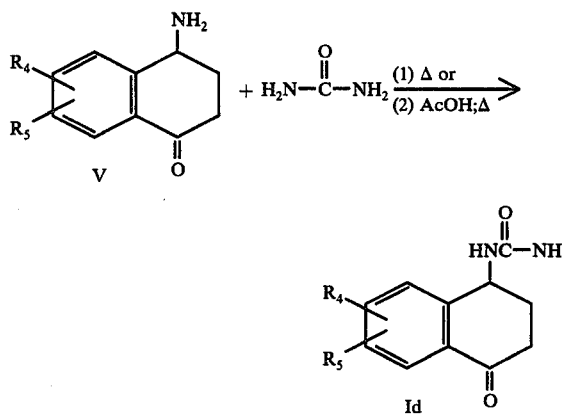

an appropriately substituted formula V amine is reacted with equimolar, preferably excess (5% to 50%) amount of urea at a temperature in the range of 80° C to 175° C, and preferably 100° C to 150° C, from 1 to 8 hours or until the evolution of ammonia ceases.

Analogously, a formula V amine can be reacted with an alkyl carbamate, preferably with methyl or ethyl carbamate, to afford a formula Id urea compound.

Advantageously a formula Id urea can be prepared by reacting a formula V amine or its acid addition salt with urea in a solvent selected from water, aqueous acetic acid, glacial acetic acid, propionic acid and the like at reflux until the reaction is essentially complete.

Should it be desired, formula Id ureas (or the corresponding thioureas) can also be prepared by the route illustrated and described below:

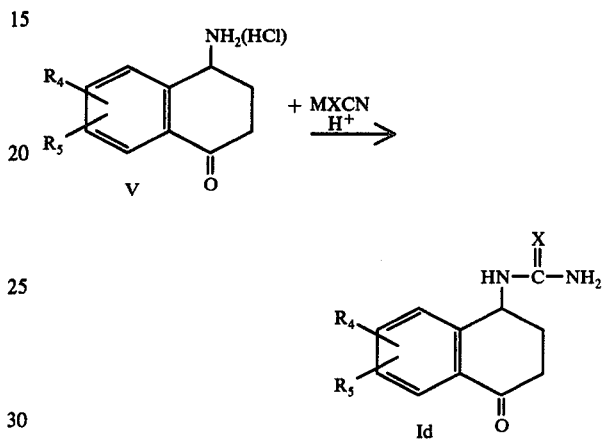

wherein X is oxygen or sulfur; $R_4$ and $R_5$ are as defined above and M is sodium or potassium.

A formula V amine or its acid addition salt is reacted with approximately equimolar amounts of sodium or potassium isocyanate or isothiocyanate; however, it is generally preferred to employ from 5% to 50% excess of the isocyanate or isothiocyanate. The reaction can be conducted at atmospheric or superatmospheric pressure at a temperature in the range of 0° C to 100° C, but is preferably conducted at atmospheric pressure at 0° C to 70° C in the presence of a solvent. Suitable solvents include water, polar solvents such as $C_1$-$C_3$ alcohols, tetrahydrofuran, dioxane, acetone, methyl ethyl ketone and the like, and mixtures thereof; in the pH range of 5 to 7, and preferably at pH 6.

Advantageously, formula I compounds having the structure:

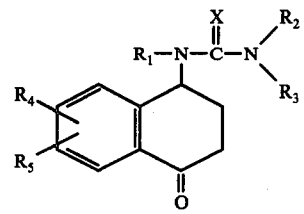

wherein X is oxygen or sulfur; $R_1$ and $R_2$ are independently hydrogen or alkyl $C_1$-$C_4$; $R_3$ is hydrogen, alkyl $C_1$-$C_4$, alkenyl $C_3$-$C_5$, alkynyl $C_3$-$C_5$, alkoxy $C_1$-$C_4$, benzyl or benzyloxy; $R_4$ is hydrogen, alkyl $C_{1-C4}$ or alkoxy $C_1$-$C_4$; $R_5$ is hydrogen or alkyl $C_1$-$C_4$, can be prepared by the route illustrated below:

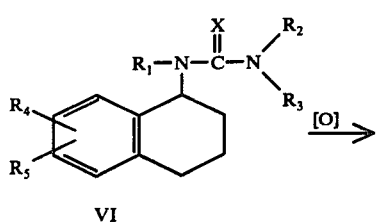

VI

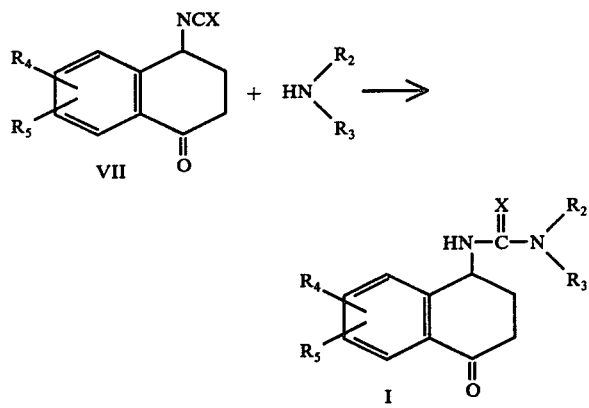

A compound of formula VI wherein X and $R_1$ to $R_5$ are as defined above is reacted with a 2 to 8 mole equivalent and preferably with a 2 to 5 mole equivalent of an oxidizing agent selected from the group consisting of ceric ammonium nitrate, ceric sulfate, chromic anhydride, sodium or potassium bichromate at a temperature between about 0° C and 100° C, and preferably 20° C to 60° C in a solvent selected from the group consisting of aqueous solutions of acetic acid, acetonitrile, tetrahydrofuran, dioxane, dimethoxyethane, diethylene glycol dimethyl ether, which may contain nitric acid, phosphoric acid or perchloric acid or chromic anhydride-acetic anhydride followed by hydrolysis.

The novel formula I 1,2,3,4-tetrahydro-4-oxo-1-naphthylurea compounds of the present invention can also be prepared from the corresponding formula VII 1,2,3,4-tetrahydro-4-oxo-1-naphthylisocyanates or isothiocyanates by reacting these isocyanates or isothiocyanates with the appropriate amines as illustrated below:

wherein X and $R_2$ to $R_5$ are as previously defined.

A formula VII isocyanate can be prepared by reacting an appropriately substituted formula V amine or its acid addition salt with phosgene, preferably under anhydrous conditions, e.g. a blanket of inert gas such as nitrogen. The reaction is initially carried out at a temperature between 0° C to 40° C, preferably 10° C to 20° C, and then heated to between about 50° C and 100° C, and preferably to from 60° C to 80° C. The reaction is usually also conducted in the presence of an organic solvent such as benzene, toluene or xylene. The thus-obtained tetrahydro-4-oxo-1-naphthylisocyanate is then reacted with an aqueous or a $C_1$–$C_3$ alcoholic solution of ammonia or an $R_2R_3$-amine solution to yield the corresponding tetrahydro-4-oxo-1-naphthylurea of formula Ic. The reaction scheme is graphically illustrated below:

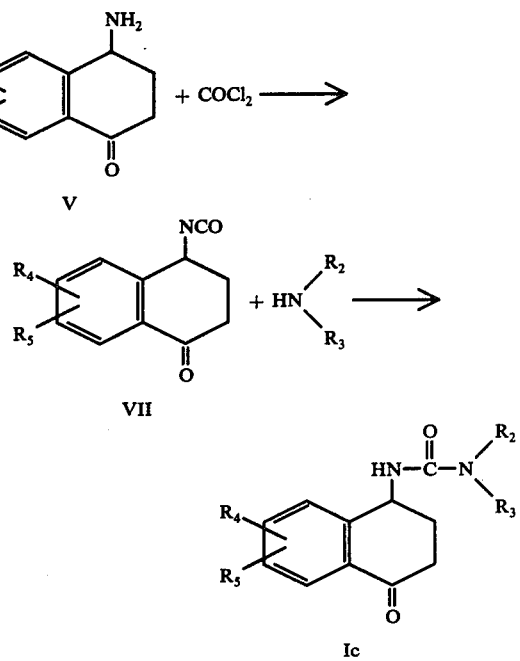

The analogous thioureas can be prepared by reacting a formula V amine with equimolar amounts of carbon disulfide, triethylamine and a carbodiimide represented by the formula: G—N=C=N—G, where G is cyclohexyl, cycloheptyl, alkyl $C_4$–$C_6$ or the like. This reaction is generally conducted in the presence of a solvent such as tetrahydrofuran or an ether such as diethyl ether, at a temperature between −10° C and +25° C. The product can be isolated by distillation or by dry-column chromatography. The thus-obtained isothiocyanate is then reacted with ammonia or an $R_2R_3$-amine as hereinbefore described to yield the desired formula Ic tetrahydro-4-oxo-1-naphthylthiourea compounds. The above reaction can be graphically illustrated as follows:

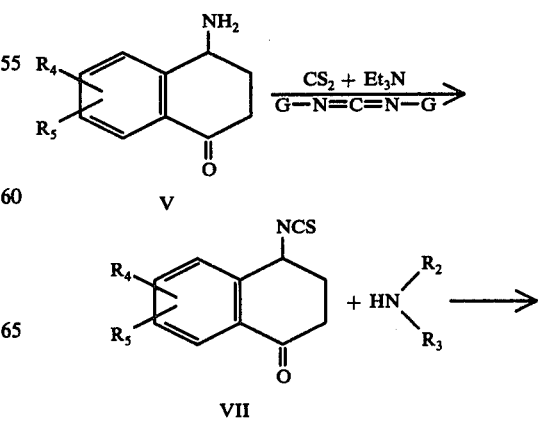

-continued

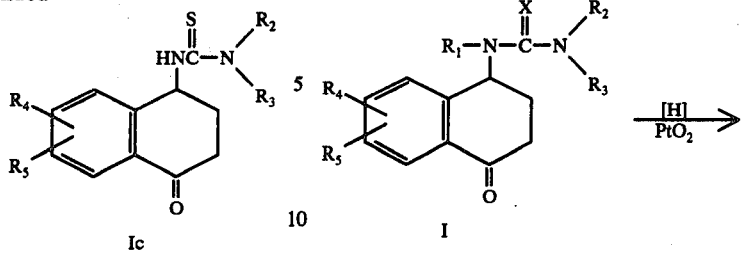

wherein $R_2$ to $R_5$ are as defined above.

Alternatively formula VII isocyanates and isothiocyanates can be prepared by the reaction of 1,1'-carbonyl or -thiocarbonyldiimidazole with a formula V amine in the presence of chloroform at ambient temperature. The reaction may be illustrated as follows:

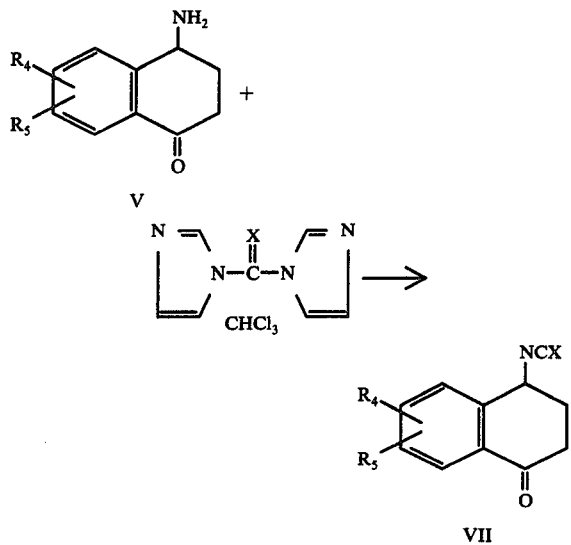

wherein X is oxygen or sulfur, $R_4$ and $R_5$ are as defined above. The thus-obtained tetrahydro-4-oxo-1-naphthyl isocyanates and isothiocyanates are then reacted as described above, to obtain the corresponding formula Ic tetrahydro-4-oxo-1-naphthylurea and thiourea compounds.

The novel 1,2,3,4-tetrahydro-4-hydroxy-(cis and trans isomers, as defined above)-1-naphthylurea (and thiourea) compounds of formula I are prepared from the corresponding formula I 4-oxo- compounds by reduction with equimolar or excess amounts of sodium borohydride, at a temperature range between about 0° C and 75° C, and preferably 20° C to 40° C, in $C_1$–$C_3$ alcohols to afford a mixture of the cis and trans isomers.

Alternatively formula I 4-oxo- compounds can be reduced catalytically in a low-pressure hydrogenation equipment in $C_1$–$C_3$ alcohols, using $PtO_2$ catalyst with or without $FeCl_3$ to afford a mixture of the cis and trans isomers of formula I tetrahydro-4-hydroxy-1-naphthylurea (thiourea) compounds.

The reaction scheme is illustrated below:

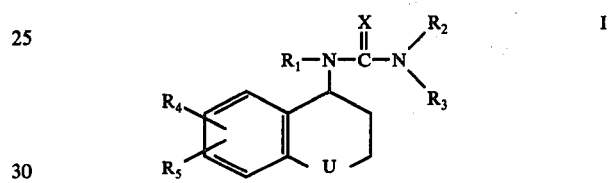

The thus-obtained formula I compounds:

wherein U is >CHOH (cis and trans), X and $R_1$ to $R_5$ are as hereinbefore defined can be acylated or alkylated to obtain formula I compounds wherein U is >$CHOR_6$ (cis and trans) and $R_6$ is acyl $C_1$–$C_4$ or alkyl $C_1$–$C_4$.

Formula I compounds wherein $R_6$ is acyl $C_1$–$C_4$ are prepared by reacting a mixture of the cis and trans isomers of formula I alcohol with an excess amount of the anhydride of a $C_1$–$C_4$ carboxylic acid at a temperature range between about 0° C and 100° C, and preferably 20° C to 75° C neat, or in the presence of a solvent. Suitable solvents include $C_1$–$C_4$ ketones; $C_1$–$C_4$ carboxylic acids; hydrocarbon solvents such as benzene, toluene or xylene; chlorinated hydrocarbon solvents such as methylene chloride, chloroform and dichloroethane; or mixtures thereof.

Formula I compounds wherein $R_6$ is $C_1$–$C_4$ alkyl are prepared by reacting a mixture of the cis and trans isomers of formula I alcohol with an excess amount of a $C_1$–$C_4$ alkyl halide (iodide-bromide) as follows:

The formula I alcohol is dissolved in anhydrous dimethylformamide and one equivalent of sodium hydride in mineral acid is added at 0° C under a nitrogen atmosphere. This addition is followed by the addition of an excess amount (e.g. 20% to 50%) of a $C_1$–$C_4$ alkyl halide, the reaction mixture stirred several hours and the product isolated by standard laboratory procedures.

As stated hereinabove the novel 1,2,3,4-tetrahydro-4-substituted-1-naphthylurea compounds of the present invention, as represented by formula I above can be prepared as the racemic mixtures or the optically active (S) and (R) forms illustrated by formulae II and III above.

It is also stated hereinabove that to obtain the optically active forms of the novel formula I compounds, it is necessary to start with the corresponding optically active (S) or (R) isomer of 1,2,3,4-tetrahydro-1-naphthylamine or an appropriate derivative thereof.

A preparation is described hereinbelow whereby the desired optical isomers of the above-said amine or certain derivatives thereof can be obtained in high yields.

The racemic mixture is treated with the appropriate (optically active) N-benzoyl glutamic acid. The (S)-(+)-1,2,3,4-tetrahydro-1-naphthylamine forms a water insoluble salt with (+)-N-benzoyl-(R)-glutamic acid which can be crystallized out in high yield while the corresponding (R)-amine salt stays in solution. It is not necessary to employ more than about one mole of the resolving acid for each two moles of racemic amine, as a cheaper acid, preferably acetic, can be substituted for the balance of required acid. In this way it is possible to obtain a high yield of the desired (S)-(+)-amine based on the resolving acid. The resolved salt, (S)-(+)-1,2,3,4-tetrahydro-1-naphthylamine-(+)-N-benzoyl-(R)-glutamic acid salt, is treated with alkali which liberates the (S)-(+)-amine which separates as an insoluble phase. It can be mechanically separated from the aqueous phase or extracted with a suitable solvent.

Compounds of the present invention represented by formula I above, wherein X is oxygen or sulfur; U is a divalent segment of the cyclohexane ring fused to the benzo ring and is selected from the moieties of the formulae: $>C=O$ and $>CHOR_6$; $R_1$ and $R_2$ are independently selected from hydrogen or alkyl $C_1-C_4$; $R_3$ is hydrogen, alkyl $C_1-C_4$, alkenyl $C_1-C_4$, alkynyl $C_1-C_4$, alkoxy $C_1-C_4$, benzyl or benzyloxy; $R_4$ is hydrogen, alkyl $C_1-C_4$, alkoxy $C_1-C_4$; $R_5$ is hydrogen or alkyl $C_1-C_4$; $R_6$ is hydrogen, alkyl $C_1-C_4$ or acyl $C_1-C_4$; the racemic mixtures, the cis and trans isomers, and the optically active isomers thereof, are particularly effective as animal growth-promoting agents.

As animal growth-promoting agents, the active compounds of this invention can be administered to said animals in their diet, implanted in the form of one or several pellets under the skin of the animal, or injected subcutaneously or intramuscularly in the form of a paste, solution or suspension.

When administered with the animal diet, generally about 0.0001% to 0.08% by weight, and preferably 0.001% to 0.04% by weight, of the drug is effective for increasing weight gains of the treated animals. Obviously the drug may also be formulated as a premix, supplement or concentrate, with other edible carriers such as ground corn, soybean meal, fish meal and the like, and then mixed with or added to the animal feed at the feeding site. In such concentrated formulations, a compound of formula I 1,2,3,4-tetrahydro-4-oxo-(-oxy-)-1-naphthylurea or its optically active isomer may amount from about 1% to 30% by weight of the formulation.

The growth rate of animals is also improved when a formula I 1,2,3,4-tetrahydro-4-oxo-(-oxy-)-1-naphthylurea is administered as a subcutaneous implant under the skin of the animal. Implants are generally in the form of a paste or pellet which permits the active compound to be released into the bloodstream of the animal over an extended period of time; as for example, from several weeks to several months.

Whether the implant is in the form of a paste or a pellet is a matter of choice. Pellet-type implants which can be used in accordance with this invention may be prepared by admixing from about 50% to 95% by weight of a compound of the formula I 1,2,3,4-tetrahydro-4-oxo-(-oxy-)-1-naphthylurea compound or its optically active isomer with from about 50% to 5% by weight of a pharmaceutically acceptable carrier such as Castorwax (i.e., glyceryl 12-hydroxystearate), white wax, beeswax, starch, or a high molecular weight (i.e., 4000) polyethylene glycol, or mixtures thereof, alone or in combination with a small amount of a lubricant such as zinc stearate or magnesium stearate. A small amount of polyvinylpyrrolidone and dibutylphthalate may also be incorporated in the above-said formulations.

Paste implants can be prepared using the same percentages of drug as stated above, but employing a mixture of high molecular weight (i.e., 4000) polyethylene glycol and low molecular weight (i.e., 400) polyethylene glycol alone, or in combination with, Castorwax or beeswax and/or polyvinylpyrrolidone.

Implants may vary in size and weight, but usually range between 10 mg and 200 mg per implant. Advantageously, with this method of application, the drug can be administered at periodic intervals throughout the feeding period of the animals. Moreover, formulations and intervals between implantations can be varied to provide a daily drug release of generally about 0.0005 mg to 0.5 mg per kg of body weight, and preferably 0.001 mg to 0.2 mg per kg of body weight.

Typical animal feed supplements and implant formulations are as follows:

| Beef Cattle Supplement | Feed Rate | |
|---|---|---|
| | 2 lbs per Head/Day | 1 lb per Head/Day |
| Dehydrated Alfalfa Meal (17%) | 13.0% | 26.5% |
| Cotton Seed Meal (41%) | 13.5% | 27.0% |
| Limestone (33%) | 11.0% | 22.0% |
| Urea (2.81%) | 6.0% | 12.0% |
| Dried Molasses | 2.5% | 5.0% |
| Salt, Iodized | 2.5% | 5.0% |
| Vitamin-Mineral Premix[1] | 1.0% | 2.0% |
| Drug Premix[2] | 0.5% | 0.5% |
| Ground Corn | 50.0% | — |
| Vitamin A (30,000 I.U./g) | 833 g | 1666 g |
| Cobalt Sulfate ($CoSO_4 \cdot 7H_2O$) | 2 g | 4 g |
| Copper Sulfate ($CuSO_4 \cdot 5H_2O$) | 78 g | 156 g |
| Manganese Oxide (MnO) | 32 g | 64 g |
| Zinc Oxide (ZnO) | 62 g | 124 g |
| Elemental Sulfur | 2000 g | 4000 g |
| Dehydrated Alfalfa Meal | 1533 g | 3066 g |
| | 4540 g | 9080 g |

| Formula (I) 1,2,3,4-Tetrahydro-4-oxo-(-oxy-)-1-naphthylurea Level of Drug per Head/Day (mg) | Amount in Premix 2 lbs of Supplement per Day | | Amount in Premix 1 lb of Supplement per Day | |
|---|---|---|---|---|
| | Drug (g) | Ground Corn (g) | Drug (g) | Ground Corn (g) |
| 400 | 200 | 2070 | 400 | 1870 |
| 200 | 100 | 2170 | 200 | 2070 |
| 100 | 50 | 2220 | 100 | 2170 |
| 50 | 25 | 2245 | 50 | 2220 |
| 0 | 0 | 2270 | 0 | 2270 |

[1]Vitamin-Mineral Premix (per 1000 lbs of supplement)
[2]Drug Premix (per 1000 lbs of supplement)

| Typical Pellet Implant Formulations | | |
|---|---|---|
| | | Preferred |
| (A) | Formula I. 1,2,3,4-Tetrahydro-oxo-(-oxy-)-1-naphthylurea | 50.0%* |
| | Lubricant (i.e., magnesium stearate) | 0.5%* |
| | Glyceryl 12-Hydroxystearate - QS | |
| (B) | Formula I. 1,2,3,4-Tetrahydro-oxo-(-oxy-)-1-naphthylurea | 60.0&* |
| | Polyethylene glycol 4000 | 10.0%* |
| | Beeswax - QS | |
| (C) | Formula I. 1,2,3,4-Tetrahydro-oxo-(-oxy-)- | 30.0 mg |

-continued

| Typical Pellet Implant Formulations | |
|---|---|
| 1-naphthylurea | Preferred |
| Beeswax | 1.0 mg |
| Magnesium stearate | 1.5 mg |
| Dibutylphthalate | 1.0 mg |
| Polyvinylpyrrolidone (10% solution) - QS | |

*Percent by weight.

| Typical Paste Implant Formulation | | |
|---|---|---|
| | | Preferred |
| (A) | Formula I. 1,2,3,4-Tetrahydro-oxo-(-oxy-)-1-naphthylurea | 200 mg |
| | Polyethylene glycol 4000 (30% to 50%) | 40%* |
| | Polyethylene glycol 400 - QS | |

*Percent by weight.

SPECIFIC DISCLOSURE

The present invention may be further understood by referring to the examples set forth below which are provided simply by way of illustration, and are not intended to limit the invention.

EXAMPLE 1

Preparation of N-Formyl-1,2,3,4-tetrahydro-4-oxo-1-naphthylamine.

A solution of 31.4 g of chromic anhydride in 140 ml of acetic anhydride is added dropwise over 80 minutes to a stirred solution of 20 g of N-formyl-1,2,3,4-tetrahydro-1-naphthylamine in 120 ml of acetic anhydride, while maintaining the temperature of the reaction mixture between $-8°$ C to $4°$ C. The reaction mixture is then stirred an additional 35 minutes at $3°$ C, poured into an ice-water mixture and stirred overnight. The mixture is filtered and 1.5 g of solid collected. The filtrate is saturated with sodium chloride and extracted with 2 × 1000 ml of methylene chloride. The combined organic extracts are washed with 1000 ml of brine and evaporated to dryness in vacuo. The oily residue is triturated with 200 ml of ether to afford a tan solid, the mixture stirred for a while and is then filtered. The collected tan solid is washed with 2 × 5 ml of ether to afford 13 g of product, melting point $103°–106°$ C.

Substitution of sodium or potassium bichromate in the above reaction also affords the title compound.

The title compound is also prepared by reacting N-formyl-1,2,3,4-tetrahydro-1-naphthylamine with four equivalents of ceric sulfate or ceric ammonium nitrate in 50% aqueous acid at room temperature for 10 minutes. The reaction mixture is then filtered, poured into water and extracted with chloroform. The chloroform extract is evaporated to dryness in vacuo to afford the title compound.

Similarly, (+)- and (−)-N-formyl-1,2,3,4-tetrahydro-1-naphthylamines are oxidized by the above procedures to afford (+)- and (−)-N-formyl-1,2,3,4-tetrahydro-4-oxo-1-naphthylamines.

EXAMPLE 2

Preparation of 1,2,3,4-Tetrahydro-4-oxo-1-naphthylamine hydrochloride.

A solution of 19.6 g of N-formyl-1,2,3,4-tetrahydro-4-oxo-1-naphthylamine in 214 ml of 95% ethanol and 214 ml of 2N hydrochloric acid is heated at reflux for 3 hours and then stirred at room temperature for 2 days. The solution is filtered and the filtrate concentrated in vacuo to afford a dark residue. The residue is dried using ethanol to remove water in vacuo and this procedure affords 20.2 g of the title compound, melting point $200°–216°$ C (dec.).

EXAMPLE 3

Preparation of 1,2,3,4-Tetrahydro-4-oxo-1-naphthylisocyanate.

A mixture of 1,2,3,4-tetrahydro-4-oxo-1-naphthylamine hydrochloride (19.8 g) and 500 ml of toluene is stirred rapidly at $85°$ C and phosgene is bubbled into the mixture until a virtually clear solution forms. Nitrogen is passed through the solution, the mixture filtered to remove unreacted amine hydrochloride. The filtrate is evaporated to dryness in vacuo to afford 12.9 g of the title isocyanate.

EXAMPLE 4

Preparation of 1,2,3,4-Tetrahydro-4-oxo-1-naphthylurea.

A solution of 11.0 g of N-formyl-1,2,3,4-tetrahydro-4-oxo-1-naphthylamine in 120 ml of 95% ethanol and 120 ml of 2N hydrochloric acid is heated at reflux for 3 hours and then stirred at room temperature overnight. The solution is filtered and concentrated in vacuo to afford a brownish-red solid. About 120 ml of ethanol is added to the solid and the mixture is then further concentrated in vacuo to yield 11.3 g of solid. This solid is added to 60 ml of water and filtered. The insoluble residue is washed with 16 ml of water and the aqueous fractions are combined, stirred and a solution of potassium isocyanate in 24 ml of water added dropwise. The mixture is stirred overnight, the precipitated brown solid collected and washed with water and then with cold methanol to afford 10.4 g of the title compound, a grayish-brown solid, melting point $235°–238°$ C (dec.).

EXAMPLE 5

Preparation of 1,2,3,4-Tetrahydro-4-hydroxy-1-naphthylurea (cis and trans isomeric mixture).

To a stirred solution of 4.6 g of 1,2,3,4-tetrahydro-4-oxo-1-naphthylurea in 230 ml of ethanol 0.85 g of sodium borohydride is added. The reaction mixture is stirred for about 5 hours and after standing overnight 50 ml water is added while stirring. The mixture is then evaporated in vacuo to remove the solvent. Water (50 ml) is added, then glacial acetic acid is added, until the foaming caused by the acid ceases. The solution is evaporated to dryness in vacuo, alcohol is added and the whole evaporated to dryness in vacuo. Then 30 ml of ethanol is added to the residue and the mixture stirred and filtered. The collected insoluble solid is air dried. This solid is heated with 300 ml of acetone and filtered. The filtrate is concentrated in vacuo to afford 0.55 g of the title compound, melting point $170°–176°$ C. On further work-up of the acetone mother liquor, 0.2 g of the title compound, melting point $169°–174°$ C, is recovered.

The original ethanol filtrate is evaporated to dryness in vacuo and the residue dissolved in 300 ml of hot acetone. The acetone solution is filtered and concentrated to afford white crystals which are collected and washed with cold acetone to afford an additional 1.4 g.

of title compound, melting point 175°–177° C. The compounds reported in the Table are prepared by the procedure of Example 5 using the appropriate 1-substituted-3-(1,2,3,4-tetrahydro-4-oxo-1-naphthyl)urea, as shown in Example 8.

TABLE I

NH—CX—NR$_2$R$_3$

| CL Number | R$_2$ | R$_3$ | X | Melting Point ° C |
|---|---|---|---|---|
| | H | —OCH | O | 159–160 |
| | H | CH$_2$—CH$_6$H$_5$ | O | 200–202 |
| | H | —OCH$_2$—C$_6$H$_5$ | O | 125–127 |
| 217,197 | CH$_3$ | CH$_3$ | O | 188–190 |
| 217,193 | C$_2$H$_5$ | H | O | 189–192 |
| 217,183 | i-C$_3$H$_7$ | H | O | 190–193 |
| 113,642 | H | —HC CCH$_2$ | O | 163–165 |
| 113,645 | H | H | O | 173–177 (levorotatory) |
| 217,125 | C$_2$H$_5$ | H | S | 181–183 |

EXAMPLE 6

Preparation of 1-Methyl-3-(1,2,3,4-tetrahydro-4-oxo-1-naphthyl)urea.

To a stirred mixture of 10 g of 1,2,3,4-tetrahydro-4-oxo-1-naphthylamine hydrochloride in 200 ml of dry tetrahydrofuran (THF) under a nitrogen atmosphere, 76 ml of triethylamine is added dropwise. The mixture is stirred for an additional 5 minutes, and 3 ml of methylisocyanate is added dropwise. The reaction mixture is stirred for 1 hour at room temperature and the solid collected. The filter cake is washed with THF and then with 3 × 50 ml of water. The THF filtrate is concentrated in vacuo to afford some product. The water-insoluble solid is air dried to afford 8.8 g of the title compound melting point 219°–221° C. Recrystallization from about 150 ml of methanol yeilds 7.4 g of the above product, melting point 220°–223° C.

EXAMPLE 7

Preparation of 1-Methyl-3-(1,2,3,4-tetrahydro-4-hydroxy-1-naphthyl)urea (cis and trans isomeric mixture).

1-Methyl-3-(1,2,3,4-tetrahydro-4-oxo-1-naphthyl)urea (3.3 g) is hydrogenated in the presence of 0.3 g of PtO$_2$/0.05 mmole FeCl$_3$ solution in 300 ml of 95% ethanol using a low-pressure all-glass hydrogenator. After 615 ml of hydrogen is absorbed, the excess hydrogen is removed by purging the system with nitrogen. The solution is filtered and evaporated to dryness in vacuo to afford 3.4 g of an oil. The oil is stirred with about 20 ml of acetone and the formed white solid is collected to afford 1.6 g of the title compound as a cis/trans mixture, melting point 172°–180° C.

EXAMPLE 8

The following formula I 1,2,3,4-tetrahydro-4-oxo-1-naphthylurea compounds are prepared by reacting 1,2,3,4-tetrahydro-4-oxo-1-naphthylisocyanate or isothiocyanate with the appropriately substituted amines, or by reacting 1,2,3,4-tetrahydro-4-oxo-1-naphthylamine hydrochloride with the appropriately substituted isocyanates, isothiocyanates or carbamoyl chlorides by the process of Example 6. The compounds obtained are listed in Table I below.

TABLE I

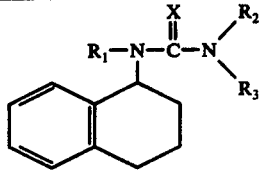

I

| R$_1$ | X | R$_2$ | R$_3$ | Melting Point ° C |
|---|---|---|---|---|
| H | O | H | 2-C$_4$H$_9$ | 176–178 |
| H | O | CH$_3$ | CH$_3$ | |
| H | O | H | OCH$_3$ | 163–165 |
| H | O | H | OC$_4$H$_9$ | |
| H | O | H | OC$_2$H$_5$ | |
| H | O | H | OCH$_2$—C$_6$H$_5$ | 100–103 |
| H | O | H | CH$_2$—C$_6$H$_5$ | 172–175 |
| H | O | H | CH$_2$—C≡CH | 149–150 resolidifies, m.p. 177–178 |
| H | S | H | CH$_3$ | |
| CH$_3$ | O | H | CH$_3$ | |
| H | S | H | C$_2$H$_5$ | 136.5–139.5 |

EXAMPLE 9

Preparation of 1,2,3,4-Tetrahydro-4-oxo-1-naphthylurea and N-substituted analog thereof.

1,2,3,4-Tetrahydro-4-oxo-1-naphthylisocyanate (5.0 g) in tetrahydrofuran is added to a rapidly stirred aqueous concentrated ammonium hydroxide solution (excess) to afford 1,2,3,4-tetrahydro-4-oxo-1-naphthylurea.

Similarly, substitution of ammonia in the above reaction by methylamine, dimethylamine, propylamine, isopropylamine, ethylamine, diethylamine, dipropylamine, butylamine, 2-butylamine and dibutylamine affords 1-methyl-, 1,1-dimethyl-, 1-propyl-, 1-isopropyl-, 1-ethyl-, 1,1-diethyl-, 1,1-dipropyl-, 1-butyl-, 1-(2-butyl)-, and 1,1-dibutyl-3-(1,2,3,4-tetrahydro-4-oxo-1-naphthyl)urea, respectively.

EXAMPLE 10

Preparation of 1,2,3,4-Tetrahydro-4-oxo-1-naphthylurea.

A mixture of a mole equivalent of 1,2,3,4-tetrahydro-4-oxo-1-naphthylamine hydrochloride and a 20% excess of urea in 1450 ml of water is heated at reflux overnight. The mixture is cooled, further diluted with water, and the title product collected by filtration and is dried.

Similarly, 1,2,3,4-tetrahydro-4-oxo-1-naphthylamine and excess urea are mixed and heated until ammonia evolution ceases. The solid product, 1,2,3,4-tetrahydro-4-oxo-1-naphthylurea, is washed with water, collected by filtration and dried.

EXAMPLE 11

Preparation of 1,2,3,4-Tetrahydro-4-oxo-1-naphthylurea.

Equimolar quantities of 1,2,3,4-tetrahydro-4-oxo-1-naphthylamine and ethylcarbamate are mixed and heated until ethanol is no longer released. The crude product, 1,2,3,4-tetrahydro-4-oxo-1-naphthylurea is washed with water then with cold ethanol and dried.

EXAMPLE 12

Preparation of (+)- and
(−)-1,2,3,4-Tetrahydro-4-oxo-1-naphthylurea.

By the method of Example 4, (+)- and (−)-N-formyl-1,2,3,4-tetrahydro-4-oxo-1-naphthylamine are hydrolyzed and reacted with sodium or potassium isocyanate to afford (+)- and (−)-1,2,3,4-tetrahydro-4-oxo-1-naphthylurea, respectively.

EXAMPLE 13

Preparation of
1,2,3,4-Tetrahydro-4-oxo-1-naphthylurea.

A solution of 0.5 g of 1,2,3,4-tetrahydro-1-naphthylurea in 50 ml of 50% aqueous acetic acid is cooled to below 5° C and 6.0 g of ceric ammonium nitrate added. After 5 minutes the mixture is diluted with water and extracted with 3 × 5 ml of ethyl acetate. The extracts are combined and evaporated to dryness to afford the crude title product.

EXAMPLE 14

Preparation of
N-Acetyl-N-methyl-1,2,3,4-tetrahydro-4-oxo-1-naphthylamine.

N-Methyl-1,2,3,4-tetrahydro-1-naphthylamine is stirred with acetic anhydride to afford N-acetyl-N-methyl-1,2,3,4-tetrahydro-1-naphthylamine, which is oxidized to N-acetyl-N-methyl-1,2,3,4-tetrahydro-4-oxo-1-naphthylamine by the method of Example 1.

EXAMPLE 15

Preparation of
1,2,3,4-Tetrahydro-4-methoxy-1-naphthylurea (cis and trans isomeric mixture).

A 2.0 g sample of 1,2,3,4-tetrahydro-4-hydroxy-1-naphthylurea (cis/trans) is stirred in 10 ml of dry dimethylformamide and one equivalent of sodium hydride in mineral oil added at 0° C under a nitrogen atmosphere. After the addition is completed, 1.2 equivalents of methyl iodide is added and the reaction mixture stirred overnight. The mixture is carefully poured on ice, neutralized with hydrochloric acid and the title compound collected by filtration. Evaporation of the filtrate to dryness and washing the residue with water affords additional title compound.

EXAMPLE 16

Preparation of
1,2,3,4-Tetrahydro-4-acetoxy-1-naphthylurea (cis and trans isomeric mixture).

To 10 ml of acetic anhydride 2.0 g of 1,2,3,4-tetrahydro-4-hydroxy-1-naphthylurea (cis/trans) is added and the mixture stirred for 1 hour. The mixture is poured into water and the title compound collected by filtration. Evaporation of the mother liquor in vacuo affords additional title compound.

The compound 1,2,3,4-tetrahydro-4-n-butyryloxy-1-naphthylurea can be prepared by the above procedure of Example 16 by substituting butyric anhydride for acetic anhydride.

EXAMPLE 17

Mouse Growth Regulant Tests.

CFI female mice from Carworth Farm are received when they are six weeks old. They are housed ten to a cage in air-conditioned rooms (72°–76° F) with automatically controlled lights, 14 hours on and 10 hours off. The basal diet used in these studies is Purina Laboratory Chow (see description below), which is supplied ad libitum. Water is also allowed ad libitum.

Thirteen days after arrival, the mice are weighed in groups of ten and assigned at random to the different treatments. The concentration of the different compounds in the diet is indicated in the following Tables. Twelve days later the mice are weighed again and the experiment terminated. At least three cages (30 mice) of untreated controls are included in each test. Test data are provided in Table II below, wherein data are reported as percent weight gain over controls. The following is a description of the diet to which the growth-promoting compounds are added.

DIET

| GUARANTEED ANALYSIS | |
|---|---|
| Crude protein not less than | 23.0% |
| Crude fat not less than | 4.5% |
| Crude fiber not more than | 6.0% |
| Ash not more than | 9.0% |

INGREDIENTS

Meat and bone meal, dried skimmed milk, wheat germ meal, fish meal, animal liver meal, dried beet pulp, ground extruded corn, ground oat groats, soybean meal, dehydrated alfalfa meal, cane molasses, animal fat preserved with BHA, vitamin $B_{12}$ supplement, calcium pantothenate, choline chloride, folic acid, riboflavin supplement, brewers' dried yeast, thiamin, niacin, vitamin A supplement, D activated plant sterol, vitamin E supplement, calcium carbonate, dicalcium phosphate, iodized salt, feric ammonium citrate, iron oxide, manganous oxide, cobalt carbonate, copper oxide, zinc oxide.

TABLE II

Effectiveness of
1,2,3,4-Tetrahydro-4-oxo-(oxy-)-naphthylureas
as Animal Growth-Promoting Agents Reported as Percent
Weight Gain Over Controls Using
Mice as the Test Animal

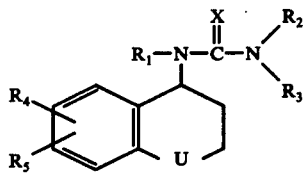

| Rate ppm in Diet | X | U | $R_1$ | $R_2$ | $R_3$ | $R_4$ | $R_5$ | % Weight Gain Over Controls |
|---|---|---|---|---|---|---|---|---|
| 50 | O | C(=O) | H | H | H | H | H | 35.71 |
| 100 | | | | | | | | 97.40 |
| 200 | | | | | | | | 93.51 |
| 200 | O | C(=O) | H | $CH_3$ | H | H | H | 69.00 |
| 400 | O | C(=O) | H | 2-Bu | H | H | H | 19.00 |
| 400 | O | CH(OH) cis/trans | H | H | H | H | H | 95.00 |
| 200 | O | CH(OH) | H | H | $OCH_3$ | H | H | 86 |
| 400 | O | CH(OH) | H | H | benzyl | H | H | 61 |
| 400 | O | CH(OH) | H | H | Benzyloxy | H | H | 70 |
| 400 | O | CH($OCH_3$) | H | H | H | H | H | 69.4 |
| 50 | O | C=O | H | H | H | H | H | 53.2 |
| 100 | | (S)-(−) | | | | | | 82.7 |
| 400 | O | C=O | H | i-$C_3H_7$ | H | H | H | +75.1 |
| 200 | O | CH—OH | H | H | HC CCH$_2$ | H | H | +44.1 |
| 200 | S | CH—OH | H | $C_2H_5$ | H | H | H | +82.0 |
| 400 | O | C—O | H | $CH_3$ | OH | H | H | +11.4 |

EXAMPLE 18

Mouse Growth Regulant Test.

By the method of Example 17, racemic 1,2,3,4-tetrahydro-4-oxo-1-naphthylurea is compared to [S]-[−]-1,2,3,4-tetrahydro-1-naphthylurea used as standard. In this comparison test five cages of ten mice each are used at each test level and at least five cages (50 mice) of untreated controls are included in each test. Test data are provided in Table III below, wherein data are reported as percent weight gain over controls for the standard and percent weight gain over the controls for racemic 1,2,3,4-tetrahydro-4-oxo-1-naphthylurea.

TABLE III

Effectiveness of Racemic 1,2,3,4-Tetrahydro-4-oxo-1-naphthylurea
as Animal Growth-Promoting Agent Reported as Percent Weight Gain
vs. (S)-(-)-1,2,3,4-Tetrahydro-1-naphthylurea (The Standard)
Using Mice as the Test Animal

| Rate ppm in Diet | % Weight Gain; Standard Over Controls | % Weight Gain, Racemic 1,2,3,4-Tetrahydro-4-oxo-1-naphthylurea Over Controls |
|---|---|---|
| 50 | 22.73 | 35.71 |
| 100 | 23.38 | 97.40 |
| 200 | 72.08 | 93.51 |

EXAMPLE 19

Preparation of cis and
trans-N-(1,2,3,4-tetrahydro-4-methoxy-1-naphthyl)acetamide.

A mixture of racemic N-(1,2,3,4-tetrahydro-4-oxo-1-naphthyl)acetamide (3.9 g) and 150 ml. tetrahydrofuran (THF) is stirred and 17 ml. of methyl iodide and 24.4 g. of freshly prepared silver oxide are added over a 4-hour period, under a nitrogen atmosphere. After 16 hours, an additional 10 ml. of methyl iodide and 11.4 g. of silver oxide are added over a 4-hour period and stirring is continued for 2 days. The mixture is filtered through a layer of celite and the filter cake washed with THF (2 × 75 ml.). The filtrate and wash solution are combined and evaporated to dryness in vacuo to afford 4.3 g. of solid. The solid is recrystallized from hexane/ether to afford 2.4 g. of title compound, melting point 97°–100° C.

Similarly, substituting ethyl iodide, n-propyl iodide, isopropyl iodide and n-butyl iodide for methyl iodide in the above preparation affords the corresponding 4-ethoxy, 4-n-propoxy, 4-isopropoxy and 4-n-butoxy derivatives, respectively.

EXAMPLE 20

Preparation of cis and trans-1,2,3,4-tetrahydro-4-methoxy-1-naphthylamine.

A mixture of 6.9 g. of cis and trans-N-(1,2,3,4-tetrahydro-4-methoxy-1-naphthyl)acetamide, 56.11 g. of potassium hydroxide, 50 ml. of ethylene glycol and 20 ml. of water is stirred and heated at reflux for an overnight period. The mixture is cooled, 100 ml. of water is added and the mixture extracted with methylene chloride (3 × 50 ml.). The combined extract was washed with 125 ml. of 10% sodium hydroxide solution, dried and evaporated in vacuo to afford 5.7 g. of title product – an oil. This oily amine is used without further purification for the preparation of the urea derivative.

Hydrolysis of the 4-ethoxy, 4-n-propoxy, 4-isopropoxy and 4-n-butoxy homologs in the same manner affords the corresponding naphthylamines.

EXAMPLE 21

Preparation of cis and trans-1,2,3,4-tetrahydro-4-methoxy-1-naphthylurea.

A 5.4 g. sample of cis/trans-1,2,3,4-tetrahydro-4-methoxy-1-naphthylamine and 20 ml. of water are mixed, stirred and the pH of the mixture adjusted to 6 with 4N hydrochloric acid. The resulting solution is filtered through glass wool, 6.15 g. of potassium cyanate is added and the reaction mixture stirred overnight. The white precipitate formed is collected, washed with water and dried to afford 5.7 g. of the title compound, melting point 159°–165° C. Recrystallization from ethyl acetate affords 3.8 g., melting point 173°–177° C.

In the same manner, cis/trans-1,2,3,4-tetrahydro-7-n-butoxy-1-naphthylamine is converted to cis/trans-1,2,3,4-tetrahydro-7-n-butoxy-1-naphthylurea.

EXAMPLE 22

Growth Enhancement and Feed Efficiency Evaluations in Sheep

To determine the effect of feeding 1,2,3,4-tetrahydro-4-oxo-1-naphthylurea to sheep, wether lambs are randomly allotted to pens in groups of six. The sheep are weighed and permitted food and water ad libitum. The feed is weighed daily, and uneaten feed from the previous day collected and weighed. Lambs receiving unmedicated diet are used as controls, while treated lambs receive the same diet, but with 15 ppm or 60 ppm (parts per million) of test drug added. At the end of the six-week treatment period, the lambs are again weighed, and total feed consumed is calculated.

Six-week weight gains and kg feed per kg gain are presented in the Table below. The diet used is also provided below.

LAMB DIET

| | % |
|---|---|
| Ground Corn Cob | 15.0 |
| Ground Yellow Corn | 48.0 |
| Soybean Oil Meal (49%) | 10.0 |
| Dehydrated Alfalfa Meal | 15.0 |
| Molasses | 10.0 |
| Iodized Salt | 0.5 |
| Dicalcium Phosphate | 1.0 |
| Premix | 0.5 |
| | 100.0 |

| Premix for One Ton | |
|---|---|
| Tra-Min #3[1] | 454 gms. |
| Vitamin A (30,000 u/g) | 133 |
| Vitamin D$_3$ (200,000 u/g) | 5 |
| Corn Oil | 100 |
| Ground Corn | 3848 |
| | 4540 |

| [1]Tra-Min #3: | Calcium | 21.00% |
|---|---|---|
| | Manganese | 12.00% |
| | Iron | 6.00% |
| | Zinc | 5.00% |
| | Copper | 0.65% |
| | Iodine | 0.35% |
| | Cobalt | 0.25% |

TABLE 1

| | | Average Six-Week Lamb Gain (kg) | | | |
|---|---|---|---|---|---|
| Treatment | Level (ppm) | Average Daily Gain | Percent Improvement | Feed/kg Gain | Percent Improvement |
| Control | 0 | 0.178 | — | 8.427 | — |
| 1,2,3,4-Tetrahydro- | 15 | 0.179 | — | 8.089 | 4.01 |
| 4-oxo-1-naphthylurea | 30 | 0.188 | 4.96 | 7.789 | 7.57 |
| | 60 | 0.192 | 7.29 | 7.829 | 7.10 |

EXAMPLE 23

Growth Enhancement and Feed Efficiency Evaluation in the Chick

To determine the effect of feeding 1,2,3,4-tetrahydro-4-oxo-1-naphthylurea on the growth and feed efficiency of the chicken, five male and female day-old Hubbard × Arbor Acre chicks were randomly allotted to battery pens. Four such pens were fed and basal diet described below, and 1,2,3,4-tetrahydro-4-oxo-1-naphthylurea was added to the diet of two additional such pens for each level of test compound used; i.e. 5, 10, and 20 ppm. Each pen of chicks was weighed initially, and after 13 days on experiment, feed consumption was determined for each pen. Feed and water were supplied ad libitum. Average 13-day chick weights for control and treated birds were determined and are reported below. Average feed per gain ratios for control and treated birds was also determined and are reported below.

From the data reported in the Table below, it can be seen that 5, 10 and 20 ppm of 1,2,3,4-tetrahydro-4-oxo-1-naphthylurea improved the rate of gain and feed efficiency of the chickens receiving the treated diets.

| CHICK BASAL DIET | |
|---|---|
| Ingredient: | % |
| Ground yellow corn | 53.45 |
| Soybean oil meal (49%) | 28.0 |

-continued
CHICK BASAL DIET

| | |
|---|---|
| Menhaden fish meal (60%) | 5.0 |
| Corn gluten meal (60%) | 5.0 |
| Dehydrated alfalfa meal (17%) | 2.0 |
| Stabilized fat | 4.0 |
| Dicalcium phosphate | 1.2 |
| Ground limestone | 0.5 |
| Sodium chloride | 0.3 |
| Vitamin premix[(1)] | 0.5 |
| Tra-Min #3[(2)] | 0.05 |
| TOTAL | 100.00 |

[(1)] Vitamin Premix for One Ton:

| | | |
|---|---|---|
| DL-methionine | 453.6 | gms. |
| BHT | 113.6 | |
| Vitamin A (30,000 u/g) | 100.0 | |
| Vitamin $D_3$ (200,000 u/g) | 5.0 | |
| Vitamin E (20,000 u/lb) | 45.4 | |
| Riboflavin | 4.0 | |
| Niacinamide | 25.0 | |
| Ca. Pantothenate | 8.0 | |
| Vitamin K (menadione) | 1.0 | |
| Parvo (10%), folic acid | 13.0 | |
| Choline chloride (50%) | 908.0 | |
| Proferm (20 mg/lb), $B_{12}$ | 227.0 | |
| Corn oil | 50.0 | |
| Fine ground corn | 2582.4 | |
| TOTAL | 4536.0 | |

[(2)] Tra-Min #3:

| | | 1 lb/Ton Furnishes | |
|---|---|---|---|
| Manganese | 12.50% | 62.50 | ppm |
| Iron | 6.00% | 30.0 | |
| Zinc | 5.00% | 25.0 | |
| Copper | 0.65% | 3.25 | |
| Iodine | 0.35% | 1.75 | |
| Cobalt | 0.25% | 1.25 | |
| Calcium - min. | 15.30% | | |
| max. | 18.35% | | |

TABLE 2
Average 13-Day Gains for Treated Poultry

| Treatment | Diet ppm | Average Daily Gain in Grams | Percent Improvement | Feed/ Gram Gain | Percent Improvement |
|---|---|---|---|---|---|
| Control | 0 | 14.47 | — | 1.46 | — |
| 1,2,3,4-Tetrahydro- | 5 | 15.04 | 4.0 | 1.41 | 3.3 |
| 4-oxo-1-naphthylurea | 10 | 15.60 | 7.8 | 1.38 | 5.4 |
| | 20 | 15.72 | 8.7 | 1.38 | 5.5 |

I claim:

1. A compound selected from the group consisting of the optical isomers of the formulae:

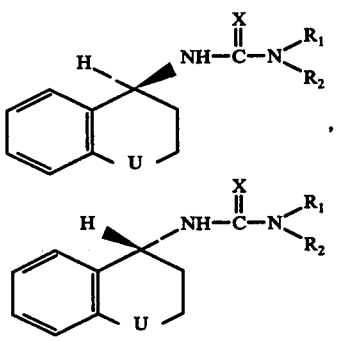

the racemic mixtures thereof and the cis and trans isomers thereof when U is not carbonyl wherein X is divalent oxygen or divalent sulfur; $R_1$ is selected from the group consisting of hydrogen and alkyl having up to 4 carbon atoms; $R_2$ is selected from the group consisting of hydrogen, allyl, 2-propynyl, alkoxy having up to 4 carbon atoms, benzyl and benzyloxy; and U is a divalent moiety selected from the group consisting of those of the formulae:

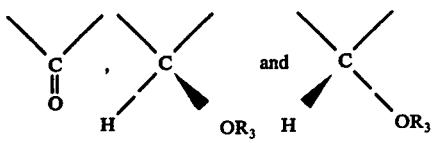

wherein $R_3$ is hydrogen, alkyl having up to 4 carbon atoms or acyl having up to 4 carbon atoms.

2. The racemic mixture according to claim 1 of 1,2,3,4-tetrahydro-4-oxo-1-naphthylurea.

3. The levorotatory isomer according to claim 1 of 1,2,3,4-tetrahydro-4-oxo-1-naphthylurea.

4. The cis and trans isomers according to claim 1 of dl-1,2,3,4-tetrahydro-4-hydroxy-1-naphthylurea.

5. The optically active isomers according to claim 1 of cis and trans dl-1,2,3,4-tetrahydro-4-hydroxy-1-naphthylurea.

6. The racemix mixture according to claim 1 of 1-methyl-3-(1,2,3,4-tetrahydro-4-oxo-1-naphthyl)urea.

7. The cis and trans isomers according to claim 1 of dl-1-methyl-3-(1,2,3,4-tetrahydro-4-hydroxy-1-naphthyl)urea.

8. The racemic mixture according to claim 1 of 1-ethyl-3-(1,2,3,4-tetrahydro-4-oxo-1-naphthyl)urea.

9. The cis and trans isomers according to claim 1 of dl-1-ethyl-3-(1,2,3,4-tetrahydro-4-hydroxy-1-naphthyl)urea.

10. The racemic mixture according to claim 1 of 1-isopropyl-3-(1,2,3,4-tetrahydro-4-oxo-1-naphthyl)urea.

11. The cis and trans isomers according to claim 1 of dl-1-isopropyl-3-(1,2,3,4-tetrahydro-4-hydroxy-1-naphthyl)urea.

12. The racemic mixture according to claim 1 of 1-methoxy-3-(1,2,3,4-tetrahydro-4-oxo-1-naphthyl)urea.

13. The cis and trans isomers according to claim 1 of dl-1-methoxy-3-(1,2,3,4-tetrahydro-4-hydroxy-1-naphthyl)urea.

14. The racemic mixture according to claim 1 of 1-(2-propynyl)-3-(1,2,3,4-tetrahydro-4-oxo-1-naphthyl)urea.

15. The cis and trans-isomers according to claim 1 of dl-1-(2-propynyl)-3-(1,2,3,4-tetrahydro-4-hydroxy-1-naphthyl)urea.

16. The racemic mixture according to claim 1 of 1-ethyl-3-(1,2,3,4-tetrahydro-4-oxo-1-naphthyl)thiourea.

17. The cis and trans isomers according to claim 1 of dl-1-ethyl-3-(1,2,3,4-tetrahydro-4-hydroxy-1-naphthyl)thiourea.

18. The racemic mixture according to claim 1 of 1-ethyl-3-(1,2,3,4-tetrahydro-4-oxo-1-naphthyl)thiourea.

19. The cis and trans isomers according to claim 1 of dl-1-ethyl-3-(1,2,3,4-tetrahydro-4-hydroxy-1-naphthyl)thiourea.

20. dl-1,1-Dimethyl-3-(1,2,3,4-tetrahydro-4-oxo-1-naphthyl)urea.

21. Cis-dl-1,1-dimethyl-3-(1,2,3,4-tetrahydro-4-hydroxy-1-naphthyl)urea.

22. Trans-dl-1,1-dimethyl-3-(1,2,3,4-tetrahydro-4-hydroxy-1-naphthyl)urea.

23. An animal feed composition for improving the feed efficiency and enhancing the growth rate of veterinary homothermic animals comprising a nutritionally balanced animal feed containing from about 0.0001% to about 0.08% by weight of a compound selected from the group consisting of the optical isomers of the formulae:

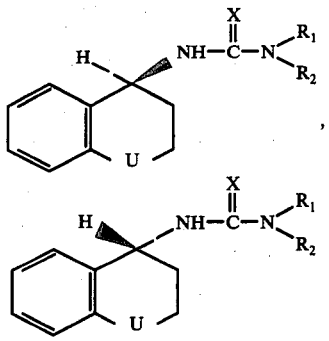

the racemic mixtures thereof and the cis and trans isomers thereof when U is not carbonyl wherein X is divalent oxygen or divalent sulfur; $R_1$ is selected from the group consisting of hydrogen and alkyl having up to 4 carbon atoms; $R_2$ is selected from the group consisting of hydrogen, allyl, 2-propynyl, alkoxy having up to 4 carbon atoms, benzyl and benzyloxy; and U is a divalent moiety selected from the group consisting of those of the formulae:

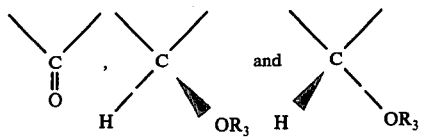

wherein $R_3$ is hydrogen, alkyl having up to 4 carbon atoms or acyl having up to 4 carbon atoms.

24. An animal feed premix for improving the feed efficiency and enhancing the growth rate of veterinary homothermic animals comprising from about 70% to about 99% by weight of an edible carrier and from about 1% to about 30% by weight of a compound selected from the group consisting of the optical isomers of the formulae:

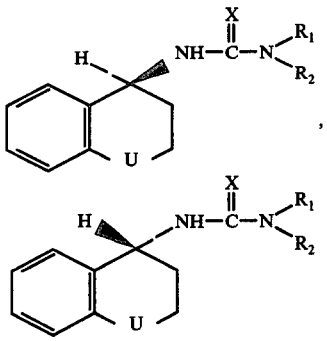

the racemic mixtures thereof and the cis and trans isomers thereof when U is not carbonyl wherein X is divalent oxygen or divalent sulfur; $R_1$ is selected from the group consisting of hydrogen and alkyl having up to 4 carbon atoms; $R_2$ is selected from the group consisting of hydrogen, allyl, 2-propynyl, alkoxy having up to 4 carbon atoms, benzyl and benzyloxy; and U is a divalent moiety selected from the group consisting of those of the formulae:

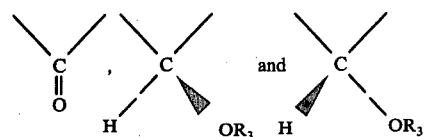

wherein $R_3$ is hydrogen, alkyl having up to 4 carbon atoms or acyl having up to 4 carbon atoms.

25. A method for improving the feed efficiency and enhancing the growth rate of veterinary homothermic animals comprising administering to said animals an effective amount of a compound selected from the group consisting of the optical isomers of the formulae:

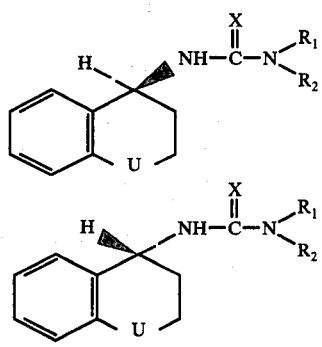

the racemic mixtures thereof and the cis and trans isomers thereof when U is not carbonyl wherein X is divalent oxygen or divalent sulfur; $R_1$ is selected from the group consisting of hydrogen and alkyl having up to 4 carbon atoms; $R_2$ is selected from the group consisting of hydrogen, allyl, 2-propynyl, alkoxy having up to 4 carbon atoms, benzyl and benzyloxy; and U is a divalent moiety selected from the group consisting of those of the formulae:

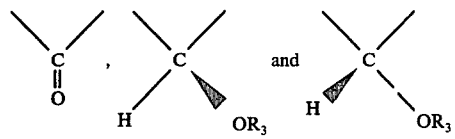

wherein $R_3$ is hydrogen, alkyl having up to 4 carbon atoms or acyl having up to 4 carbon atoms.

26. The method according to claim 25 wherein said compound is orally administered to said animals in an amount equivalent to between about 0.0001% and about 0.08% by weight of the animal feed.

27. The method according to claim 25 wherein said compound is parenterally administered as one or more subcutaneous implants beneath the skin of said animal and said implants being sufficient to provide a daily drug release of from about 0.0005 mg. to about 0.2 mg. of said compound per kilogram of animal body weight.

28. The method according to claim 25 wherein said animals are farm animals.

29. The method according to claim 25 wherein said animals are fur-bearing animals.

30. The method according to claim 25 wherein said animals are poultry.

31. The method according to claim 25 wherein said compound is racemic 1,2,3,4-tetrahydro-4-oxo-1-naphthylurea.

32. The method according to claim 25 wherein said compound is levorotatory 1,2,3,4-tetrahydro-4-oxo-1-naphthylurea.

33. The method according to claim 25 wherein said compound is cis and trans dl-1,2,3,4-tetrahydro-4-hydroxy-1-naphthylurea.

34. The method according to claim 25 wherein said compound is the optically active isomer of cis and trans dl-1,2,3,4-tetrahydro-4-hydroxy-1-naphthylurea.

35. The method according to claim 25 wherein said compound is racemic 1-methyl-3-(1,2,3,4-tetrahydro-4-oxo-1-naphthyl)-urea.

36. The method according to claim 25 wherein said compound is cis and trans dl-1-methyl-3-(1,2,3,4-tetrahydro-4-hydroxy-1-naphthyl)urea.

37. The method according to claim 25 wherein said compound is racemic 1-ethyl-3-(1,2,3,4-tetrahydro-4-oxo-1-naphthyl)urea.

38. The method according to claim 25 wherein said compound is cis and trans dl-1-ethyl-3-(1,2,3,4-tetrahydro-4-hydroxy-1-naphthyl)urea.

39. The method according to claim 25 wherein said compound is racemic 1-isopropyl-3-(1,2,3,4-tetrahydro-4-oxo-naphthyl)urea.

40. The method according to claim 25 wherein said compound is cis and trans dl-1-isopropyl-3-(1,2,3,4-tetrahydro-4-hydroxy-1-naphthyl)urea.

41. The method according to claim 25 wherein said compound is racemic 1-methoxy-3-(1,2,3,4-tetrahydro-4-oxo-1-naphthyl)urea.

42. The method according to claim 25 wherein said compound is cis and trans dl-1-methoxy-3-(1,2,3,4-tetrahydro-4-hydroxy-1-naphthyl)urea.

43. The method according to claim 25 wherein said compound is racemic 1-(2-propynyl)-3-(1,2,3,4-tetrahydro-4-oxo-1-naphthyl)urea.

44. The method according to claim 25 wherein said compound is cis and trans dl-1-(2-propynyl)-3-(1,2,3,4-tetrahydro-4-hydroxy-1-naphthyl)urea.

45. A method for improving the feed efficiency and enhancing the growth rate of veterinary homothermic animals comprising administering to said animals an effective amount of dl-1,1-dimethyl-3-(1,2,3,4-tetrahydro-4-oxo-1-naphthyl)urea.

46. A method for improving the feed efficiency and enhancing the growth rate of veterinary homothermic animals comprising administering to said animals an effective amount of cis-dl-1,1-dimethyl-3-(1,2,3,4-tetrahydro-4-hydroxy-1-naphthyl)urea.

47. A method for improving the feed efficiency and enhancing the growth rate of veterinary homothermic animals comprising administering to said animals an effective amount of trans-dl-1,1-dimethyl-3-(1,2,3,4-tetrahydro-4-hydroxy-1-naphthyl)urea.

* * * * *